United States Patent [19]

Podpaly

[11] 4,004,834

[45] Jan. 25, 1977

[54] TAPPET FOLLOWER RETRIEVAL TOOL

[76] Inventor: Alex Podpaly, 4011 Lawrence Ave., Kensington, Md. 20795

[22] Filed: Jan. 2, 1976

[21] Appl. No.: 646,261

[52] U.S. Cl. .............................. 294/19 R; 294/53.5

[51] Int. Cl.[2] ......................... B25B 9/00; B25J 1/00

[58] Field of Search ............... 294/1 R, 9, 11, 19 R, 294/19 A, 20, 22, 23, 50.7, 53.5, 55, 103, 104, 115; 56/333; 81/3 R, 3 F

[56] References Cited

UNITED STATES PATENTS

| | | | |
|---|---|---|---|
| 300,870 | 6/1884 | Immel | 294/53.5 |
| 1,616,121 | 2/1927 | Gruber | 294/104 |
| 1,846,968 | 2/1932 | Kablanow | 294/19 R |
| 2,317,688 | 4/1943 | McDonald | 294/103 R |
| 2,505,113 | 4/1950 | Handley | 294/9 |

*Primary Examiner*—Johnny D. Cherry
*Attorney, Agent, or Firm*—Walter S. Pawl

[57] ABSTRACT

The special retrieval tool has a cylindrical cupped head hinged on a lateral axis to the outer end of an extensible handle for reaching the most remote tappet followers inwardly of the crankcase through the camshaft end bearing openings, after the removal of the camshaft end bearing assembly therefrom. The cylindrical cupped head is turned to an open position at right angles to the handle to facilitate holding the open end under the desired follower to receive it when released from its bushing. A rod connected at its outer end to a plate mounted on the side of said cupped head eccentrically of said lateral axis has its inner end passed through a screw clamp so as to hold it after turning the cupped head to closed cup position in substantially parallel alignment with said handle for easy and safe withdrawal of the tool from the crankcase without danger of accidentally dropping the follower out of the cupped head into the crankcase.

2 Claims, 4 Drawing Figures

10
12
14
16
18
20
22
24
26
28
30
32
34
36
38
40
42
44
46
48

TAPPET FOLLOWER RETRIEVAL TOOL

BACKGROUND AND SUMMARY OF THE INVENTION

In the present day compact arrangements of engine assemblies in motor vehicles, difficulties have often been experienced and much time lost in repair jobs requiring the replacement of worn tappet followers, because the inner ends of worn tappet followers were usually swaged by the constant pounding of the cams on them, so that they could not be removed outwardly through their bearings, but had to be retrieved inwardly of the crankcase.

In many instances, when attempts were made to remove these followers inwardly of the crank case through openings therein formed by the removal of the camshaft and bearing assemblies, a follower, while being removed, would be accidentally dropped into the sump of the crankcase and could not be retrieved therefrom except by removing the crankcase pan, which involved an elaborate removal of accessories and parts that were in the way.

Obviously, a follower in the sump could not be left therein without the danger of tearing up the engine as soon as it was started.

It was then found possible to avoid taking these chances of dropping a follower during its retrieval by providing a special tool for remotely handling the follower in a way that it would be safely retrieved with no chance of slipping out inside the crankcase.

It is therefore an object of the present invention to provide a receptacle for a follower, mounted on an extension handle, and means for closing the receptacle in position substantially aligned with the extension handle for easy withdrawal of the receptacle from the crankcase space.

Other and more specific objects will become apparent in the following detailed description of the invention as illustrated in the accompanying drawing, wherein:

FIG. 1 is a perspective view of a preferred form of the special tool made in accordance with the present invention, with the control rod in cup open position, FIG. 2 is a side view of this tool on a reduced scale, with the control rod in cup open position, FIG. 3 is a similar view to that of FIG. 2, with the control rod in cup closed position, and FIG. 4 is a broken away view of a portion of the crankcase of the engine showing some of the tappet bearings and how the tool is used.

DETAILED DESCRIPTION OF THE DRAWING

Figures 1, 2, 3, 4:
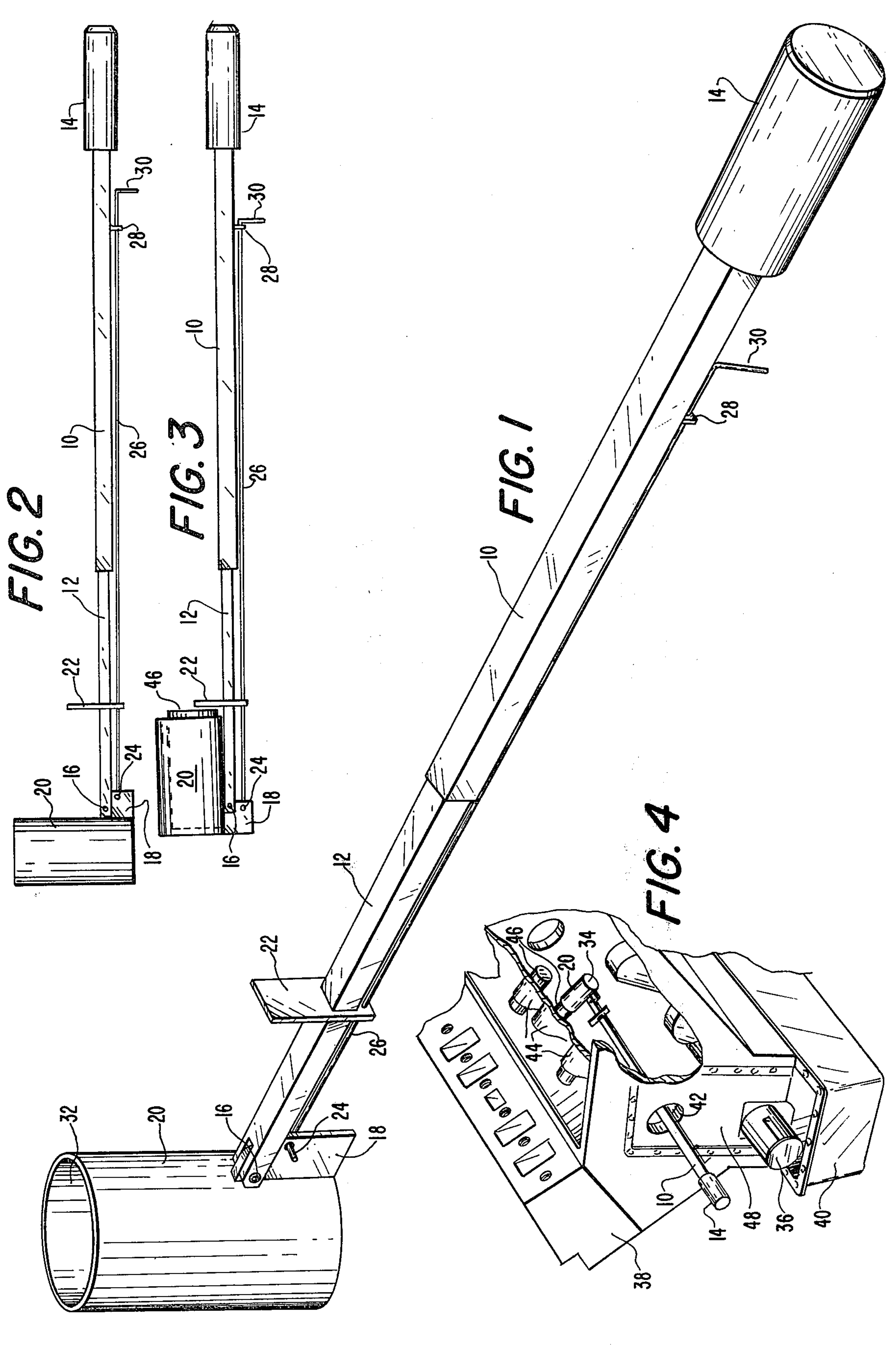

As illustrated in the drawing, the extension handle 10 has an extending portion 12, grip 14 and a cylindrical cupped head 20 hinged to its outer end on a pivot pin 16, which passes through the hinge plate 18 which is fixed to the side of said cylindrical cupped head 20 and has a pivotal connection with the outer end 24 of the control rod 26, which is slidably mounted alongside the handle, so that the cupped head 20 may be pivoted on its hinge by sliding the rod 26 between its cup open position at right angles to said handle and its substantially closed position parallel to said handle. The extending portion 12 of the handle has stop plate 22 suitably mounted thereon to provide a substantial closure of the cupped head opening when the head is moved into parallel relation with said handle after receiving a follower dropped into it inside the crankcase 38, as may be seen in FIG. 4, so that it may be safely withdrawn from the crankcase through restricted clearance spaces normally found therein.

The crankcase 38, as illustrated in FIG. 4, has a series of tappet followers 46 in bearings 44, showing one of the followers being received into the cupped head 20 at the outer end of the extension handle 10, so that the head 20 with the follower in it may be turned by the control rod to cup closed position for safe withdrawal from the inside of the crankcase.

If desired, the bottom 34 of the receptacle 20 may include a magnetic element for holding the follower from accidentally falling out before the head is safely closed in a position parallel to said handle, for withdrawal even from the more remote follower bearings in said crankcase.

The end of the crankshaft is shown at 36, the crankcase pan at 40, and the crankshaft end bearing support plate at 48. Opening 42 in the plate 48 provides the end bearing support for the camshaft assembly which has been removed and is not shown in the drawing.

A screw clamp 28 is provided on the handle for clamping the control rod 26 in any desired position of the cupped head or receptacle 20.

Although the preferred form of the invention shown in the drawing has a two part telescopic extension handle of rectangular cross section, it is to be understood that any other suitable forms may be used to provide the same novel combination providing safe retrieval of parts from remote locations inside the crankcase through small openings therein.

Many other suitable modifications in form and detail structure may be made without departing from the spirit and scope of the present invention.

What is claimed is:

1. A retrieval tool having a long handle for remotely removing worn tappet followers from their bushings inward of the engine crankcase in which they are mounted through a camshaft bearing mount opening in the end of said crankcase,

- a substantially cylindrical cup hinged at one side substantially above its bottom to the outer end of said handle, and
- a control rod slidably mounted along one side of said handle and having its outer end operatively connected to said cup, and its inner end formed to provide a control grip for turning said cup on its hinge between an open position at right angles to said handle and a substantially closed position parallel to said handle, which has a closure plate extending from it over the top of said cup in its closed position so that said cup may be withdrawn safely from said crankcase through restricting clearance spaces therein, without spilling the cup's contents.

2. A retrieval tool as defined in claim 1, and

- means for clamping slidably mounted rod in any desirably adjusted position.

* * * * *